United States Patent
Adachi et al.

(10) Patent No.: US 6,826,418 B2
(45) Date of Patent: Nov. 30, 2004

(54) RADIO CIRCUIT AND CONTROL METHOD OF RADIO CIRCUIT

(75) Inventors: Hisashi Adachi, Osaka (JP); Masanori Iida, Osaka (JP); Hiroyuki Asakura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 588 days.

(21) Appl. No.: 09/972,240

(22) Filed: Oct. 9, 2001

(65) Prior Publication Data

US 2002/0061773 A1 May 23, 2002

(30) Foreign Application Priority Data

Oct. 11, 2000 (JP) ........................................ 2000-310457

(51) Int. Cl.[7] .......................... H04B 1/38; H04B 1/16; H04B 1/06; H04B 7/00
(52) U.S. Cl. ................. 455/574; 455/232.1; 455/343.2; 455/343.5; 455/571; 455/574
(58) Field of Search ................................ 455/571, 574, 455/343.1, 343.2, 343.5, 230, 232.1, 234.1, 250.1, 296, 245.1, 246.1, 130, 131, 227

(56) References Cited

U.S. PATENT DOCUMENTS

| | | | |
|---|---|---|---|
| 4,872,206 A | | 10/1989 | Graziadei et al. ........... 455/241 |
| 5,564,092 A | | 10/1996 | Grandfield et al. ....... 455/232.1 |
| 5,886,547 A | * | 3/1999 | Durec et al. ................ 327/113 |
| 5,930,692 A | | 7/1999 | Peterzell et al. ............ 455/217 |
| 6,052,572 A | * | 4/2000 | Imura ...................... 455/343.5 |
| 6,061,385 A | * | 5/2000 | Ostman ....................... 375/130 |
| 6,081,558 A | * | 6/2000 | North .......................... 375/316 |
| 6,298,221 B1 | | 10/2001 | Nguyen ....................... 455/73 |
| 6,687,491 B2 | * | 2/2004 | Wieck ...................... 455/234.1 |

FOREIGN PATENT DOCUMENTS

| | | | |
|---|---|---|---|
| EP | 987825 | 3/2000 | ............ H04B/1/40 |
| JP | 5-37409 | 2/1993 | ............ H04B/1/18 |
| JP | 6252794 | 9/1994 | ............ H04B/1/38 |
| JP | 8307302 | 11/1996 | ............ H04B/1/40 |
| JP | 11274968 | 10/1999 | ............ H04B/1/40 |
| JP | 11317690 | 11/1999 | ............ H04B/1/38 |

OTHER PUBLICATIONS

English Language Abstract for JP Appln. No. 8–307302.
English Language Abstract for JP Appln.. No. 6–252794.
English Language Abstract for JP Appln. No. 11–274968.
English Language Abstract for JP Appln. No. 11–317690.
English Language Abstract of JP 5–37409.

* cited by examiner

*Primary Examiner*—Binh Tieu
(74) *Attorney, Agent, or Firm*—Greenblum & Bernstein, P.L.C.

(57) ABSTRACT

The invention provides a radio circuit realizing a desired receiving characteristic even when a strong-level interfering wave is received and operating with small power when no interfering wave is received. The radio circuit comprises a receiving circuit for selecting a signal having a desired frequency from received signals and demodulating the signal, an input-power detector for detecting power P1 of the receiving circuit, a received-power detector for detecting power P2 of a signal selected by the receiving circuit, and a reception control circuit for controlling the receiving circuit. The reception control circuit controls the receiving circuit at a low distortion by increasing the power consumption of a circuit included in the receiving circuit and thereby expanding the linear operation range when the power P1 detected by the input-power detector is larger than a predetermined value t1 and the power P2 detected by the input-power detector is smaller than a predetermined value t3.

18 Claims, 9 Drawing Sheets

RADIO CIRCUIT AND CONTROL METHOD OF RADIO CIRCUIT

BACKGROUND OF THE INVENTION

1. Field of the Invention

The present invention relates to a radio circuit used for radio communication and the like and a control method of the radio circuit, particularly to reduction of the power consumption of a receiving circuit.

2. Description of the Related Art

A radio circuit requires an ability to receive a desired signal even when an interfering wave is input at a predetermined level range. One of deterioration factors of the receiving characteristic due to an interfering wave is deterioration of the receiving characteristic due to reduction of a gain caused by saturation of a receiving circuit due to an interfering wave at a strong level when the level of the desired signal is low.

FIG. 9 shows a basic configuration of a conventional radio circuit. In FIG. 9, the radio circuit comprises a receiving circuit 101, a transmitting circuit 102, a receiving RF filter 103, a transmitting RF filter 104, an antenna 105, a local oscillator 106, and a base-band circuit 107. Signals having unnecessary frequencies out of signals received by the antenna 105 are reduced or attenuated by the receiving RF filter 103, and then the remaining signals are input to the receiving circuit 101. The receiving circuit 101 selects a signal with a desired frequency from the remaining signals in accordance with the output signal frequency of the local oscillator 106, demodulates the selected signal, and outputs the demodulated signal to the base-band circuit 107.

The transmitting circuit 102 modulates an output signal of the local oscillator 106 in accordance with a modulating signal supplied from the base-band circuit 107 to generate a transmission signal. The transmitting RF filter 104 reduces unnecessary frequency components from the signal transmitted from the transmitting circuit 102. Then, the transmission signal is transmitted from the antenna 105.

In the case of the above conventional radio circuit, power consumption of the receiving circuit 101 is continuously increased to expand the linear operation range in order to prevent the receiving circuit 101 from being saturated due to a strong-level interfering wave. Therefore, there is a problem that a large power consumption is generated even under a state of receiving no interfering wave.

SUMMARY OF THE INVENTION

The present invention has a purpose to provide a radio circuit and a control method of a radio circuit, in which a desired receiving characteristic can be achieved even when a strong-level interfering signal is received, but the power consumption of a receiving circuit when no interfering wave is received can be decreased.

In a first aspect of the invention, provided is a radio circuit comprising: a receiving circuit including at least one circuit of which linear-operating range changes in accordance with power consumption, the receiving circuit receiving radio signals and selecting a signal having a desired frequency from the received signals to demodulate the selected signal; an input-power detector for detecting power input to the receiving circuit; a received-power detector for detecting power of the signal selected by the receiving circuit; and a control circuit for controlling the receiving circuit. When the power detected by the input-power detector is larger than a first predetermined value and the power detected by the received-power detector is smaller than a second predetermined value, the control circuit increases power consumption of the circuit which is included in the receiving circuit and of which linear-operating range changes in accordance with power consumption to expand the linear operation range and thereby to make the receiving circuit operate at a low distortion.

In a second aspect of the invention, provided is a radio circuit comprising: a receiving circuit including at least one circuit of which linear-operating range changes in accordance with power consumption, the receiving circuit receiving radio signals and selecting a signal having a desired frequency from the received signals to demodulate the selected signal; an input-power detector for detecting power P1 input to the receiving circuit; a received-power detector for detecting power P2 of the signal selected by the receiving circuit; and a control circuit for controlling the receiving circuit. When the value of the power ratio P2/P1 based on the power P1 detected by the input-power detector and the power P2 detected by the received-power detector is smaller than a predetermined value, the control circuit increases power consumption of the circuit which is included in the receiving circuit and of which linear-operating range changes in accordance with power consumption to expand the linear operation range and thereby to make the receiving circuit operate at a low distortion.

In the radio circuit, the receiving circuit may include a filter for selecting a signal with a specific frequency to be received. The circuit of which linear operation range changes in accordance with the power consumption may be disposed immediately before the filter.

In the radio circuit, the receiving circuit may include a gain adjustment circuit for adjusting a signal gain, and decrease the gain of the gain adjustment circuit when the power detected by a received-power detector is larger than a predetermined value to suppress power consumption of at least one of the gain adjustment circuit and circuits disposed subsequently to the gain adjustment circuit.

In the radio circuit, the receiving circuit may comprise a first path, a second path of which power consumption is large than that of the first path and of which linear operation range is wider than that of the first path, and a switch for selecting either of the first and second paths in accordance with outputs of the input-power detector and the received-power detector. The path which is not selected may be controlled to stop its operation.

In the radio circuit, the second path may include a low-noise amplifier, and the input-power detector may detect the power at a point on the output side of the low-noise amplifier.

In the radio circuit, when the receiving circuit selects and receives a desired signal out of signals in a plurality of frequency bands, any signals in the plurality of frequency bands may be received through the same circuit in the receiving circuit.

In the radio circuit, reception can be performed under transmission.

In a third aspect of the invention, provided is a method of controlling a radio circuit comprising a receiving circuit including at least one circuit of which linear-operating range changes in accordance with power consumption, the receiving circuit receiving radio signals and selecting a signal having a desired frequency from the received signals to demodulate the selected signal. The method comprises: detecting input power being input to the receiving circuit;

detecting receiving power of the signal selected by the receiving circuit; and increasing power consumption of the circuit which is included in the receiving circuit and of which linear-operating range changes in accordance with power consumption to expand the linear operation range and thereby to make the receiving circuit operate at a low distortion, when the detected input power is larger than a first predetermined value and the detected receiving power is smaller than a second predetermined value.

In a fourth aspect of the invention, provided is a method of controlling a radio circuit comprising a receiving circuit including at least one circuit of which linear-operating range changes in accordance with power consumption, the receiving circuit receiving radio signals and selecting a signal having a desired frequency from the received signals to demodulate the selected signal. The method comprises: detecting input power being input to the receiving circuit; detecting receiving power of the signal selected by the receiving circuit; and increasing power consumption of the circuit which is included in the receiving circuit and of which linear-operating range changes in accordance with power consumption to expand the linear operation range and thereby to make the receiving circuit operate at a low distortion, when the value of the power ratio P2/P1 based on the detected input power P1 and the detected receiving power P2 is smaller than a predetermined value.

DESCRIPTION OF THE PREFERRED EMBODIMENTS

Preferred embodiments of a radio circuit of the present invention are described below by referring to FIGS. 1 through 7.
Embodiment 1

Figure 1:
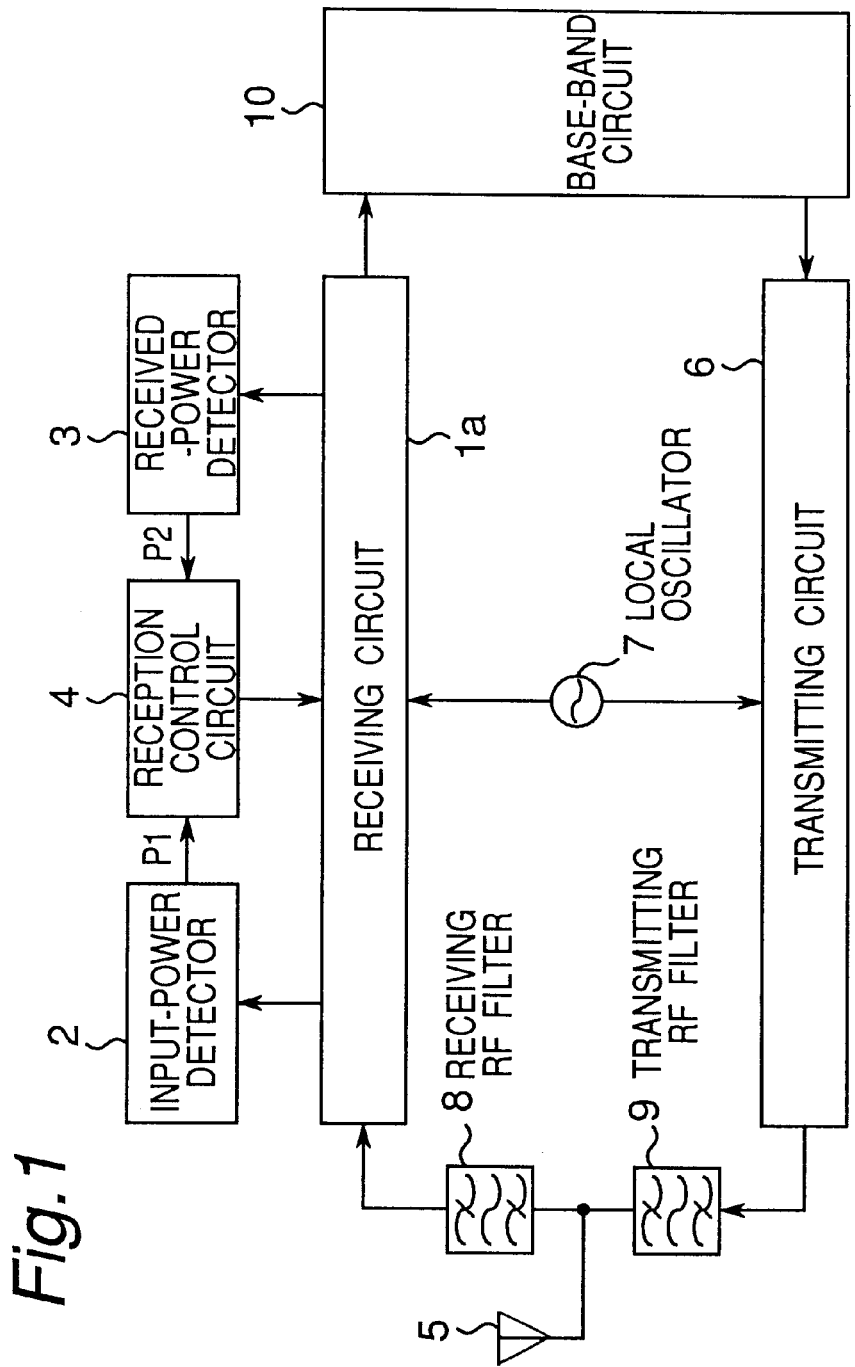
FIG. 1 is a block diagram of a radio circuit of the present invention.

FIG. 1 shows a configuration of a radio circuit of the present invention. As shown in FIG. 1, the radio circuit comprises a receiving circuit 1a, an input-power detector 2, a received-power detector 3, a reception control circuit 4, an antenna 5, a transmitting circuit 6, a local oscillator 7, a receiving RF filter 8, a transmitting RF filter 9, and a base-band circuit 10.

Signals having unnecessary frequencies out of signals received by the antenna 5 are reduced or attenuated by the receiving RF filter 8 and then the remaining signals are input to the receiving circuit 1a. The receiving circuit 1a selects a desired frequency of a signal from the remaining signals in accordance with the frequency of the local oscillator 7, demodulates the selected signal with a desired frequency, and inputs the demodulated signal to the base-band circuit 10. A transmission frequency of the transmitting circuit 6 is decided in accordance with the frequency of the local oscillator 7. The circuit 6 generates a transmission signal in accordance with a modulating signal supplied from the base-band circuit 10. Unnecessary frequency components of the transmission signal are attenuated by the transmitting RF filter 9 and subsequently the transmission signal is transmitted from the antenna 5.

The input-power detector 2 detects power P1 that is input to the receiving circuit 1a (hereafter referred to as "input power"). The received-power detector 3 detects power P2 of a signal having a frequency selected by the receiving circuit 1a (hereafter referred to as "received power"). The reception control circuit 4 controls the power consumption of the receiving circuit 1a in accordance with the input power P1 and the received power P2 to change a linear operation range of the receiving circuit 1a. That is, when the input power P1 is larger than a predetermined value t1 and the received power P2 is smaller than a predetermined value t2, the reception control circuit 4 controls the receiving circuit 1a so as to increase the power consumption of the receiving circuit 1a and thereby to make the receiving circuit 1a operate with a low distortion and a wide linear operation range. The base-band circuit 10 generates an audio signal from a demodulated signal supplied from the receiving circuit 1a and generates a modulated signal to be supplied to the transmitting circuit 6 in accordance with an audio signal to be transmitted.

In general, deterioration of the receiving characteristic due to an interfering wave is caused by the fact that a receiving circuit is saturated when the interfering wave is large and a signal wave having a desired frequency (hereafter referred to as "desired wave") is small and the signal of the desired wave is suppressed. In the case of the radio circuit in FIG. 1, the input power P1 is proportional to the received power P2 under a state in which no interfering wave is received (under normal state). Therefore, when the receiving characteristic is deteriorated due to an interfering wave, that is, when an interfering wave is large and a desired wave is small, the input power P1 increases compared to that in the normal state and the received power P2 decreases compared to that in the normal state.

Therefore, when an interfering wave is large and a desired wave is small, that is, when the input power P1 becomes larger than that in the normal state and the received power P2 becomes smaller than that in the normal state, the power consumption of the receiving circuit 1a is increased to expand the linear operation range of the circuit 1a so that the circuit 1a is not saturated. Thereby, deterioration of the receiving characteristic is prevented. When the interfering wave is small, it is possible to suppress the power consumption of the radio circuit by operating the receiving circuit 1a with a low power consumption. This can increase the operable period of the radio circuit when, for example, the power is provided to the radio circuit from a battery.

Figure 8:
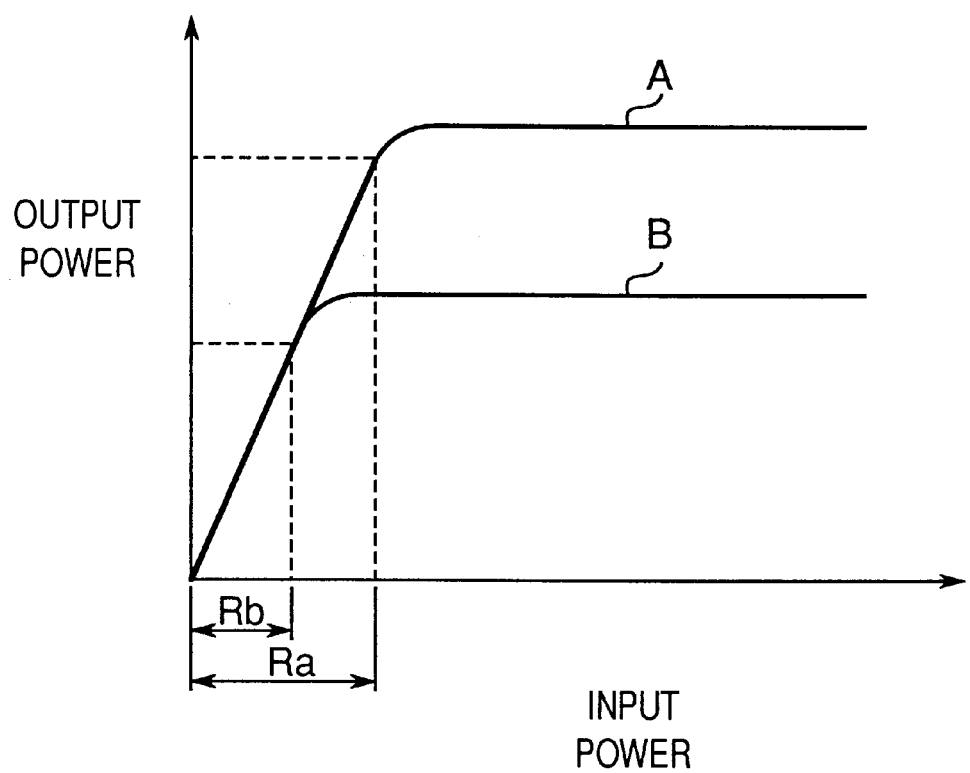
FIG. 8 is graphs showing two different operating characteristics of a mixer (output power to input power characteristic).
Figure 9:
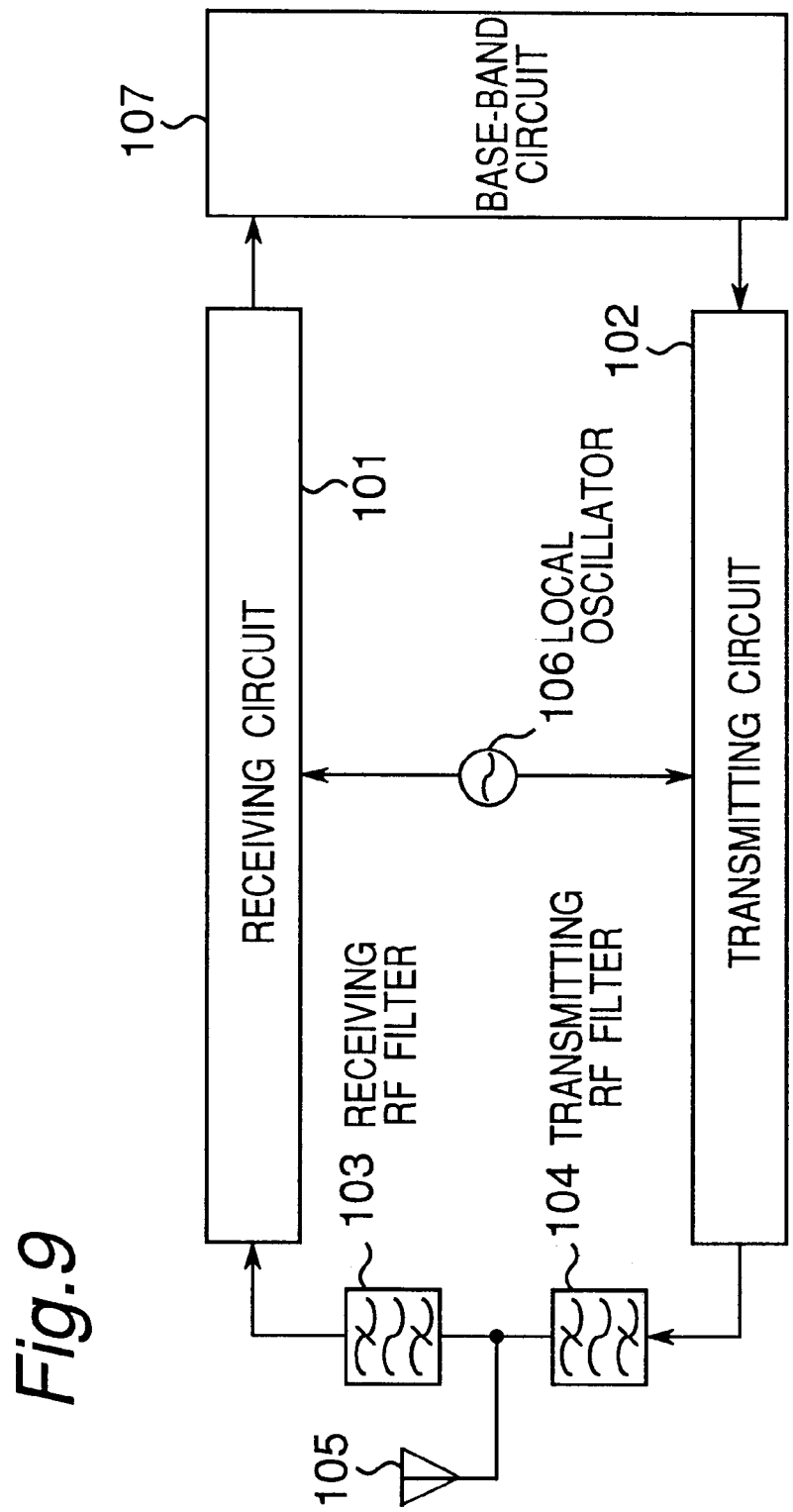
FIG. 9 is a block diagram of a conventional radio circuit.

FIG. 8 shows examples of operating characteristic of the receiving circuit 1a. FIG. 8 shows two different kinds of characteristics. The characteristic shown by the curve A has larger linear operation range Ra than the range Rb shown by the curve B. That is, to expand the linear operation range of the circuit 1a is to switch the operating characteristic of the circuit 1a from the characteristic shown by the curve B to the characteristic shown by the curve A, so that the circuit 1a is not saturated.

The radio circuit may be configured to be operable to perform reception and transmission at the same time such as CDMA. In the case of the radio system such as the CDMA for performing reception under transmission, an output of the transmitting circuit 6 interferes with a received signal. The level of a transmission signal fluctuates depending on the time and place. Therefore, when a radio circuit is a radio system for performing reception under transmission in a method of CDMA or the like, the level of a transmission signal is detected and the receiving circuit 1a is controlled to operate at a low power consumption while the detected transmission-signal level is low. Thus it is possible to suppress the whole power consumption and increase the receivable time when the radio circuit operates with a battery.

When a radio circuit uses signals in a plurality of frequency bands, the number of interfering waves which may be input to the receiving circuit 1a is also increased because the receiving RF filter 8 has a plurality of frequency bands as pass bands. Therefore, a wide range is requested as the linear operation range of the receiving circuit and the power consumption increases. However, in the case of the radio circuit of this embodiment, because the power consumption is decreased when there is no interfering wave as described above, it is possible to greatly decrease the power consumption as a whole. In this case, signals in any frequency bands may preferably be received through the same circuit in the receiving circuit 1a.

Furthermore, the radio circuit may determine a state in which an interfering wave is large and a desired wave is small by using the power ratio P2/P1 between the input power P1 and received power P2 to control the receiving circuit 1a. That is, the reception control circuit 4 may compare the power ratio P2/P1 with a predetermined value R, determine a state in which an interfering wave is large and a desired wave is small when the ratio P2/P1 is smaller than the predetermined value R, and control the receiving circuit 1a so that the receiving circuit 1a operates with a large power consumption and a small distortion and that the linear operation range is wide. This case is simply equal to a case of detecting gain reduction of the receiving circuit 1a due to saturation, and it is possible to prevent the receiving circuit 1a from being saturated when the level of the desired wave is high.

The control of the power consumption of the receiving circuit 1a of a radio circuit is described below in detail.

Figure 2:
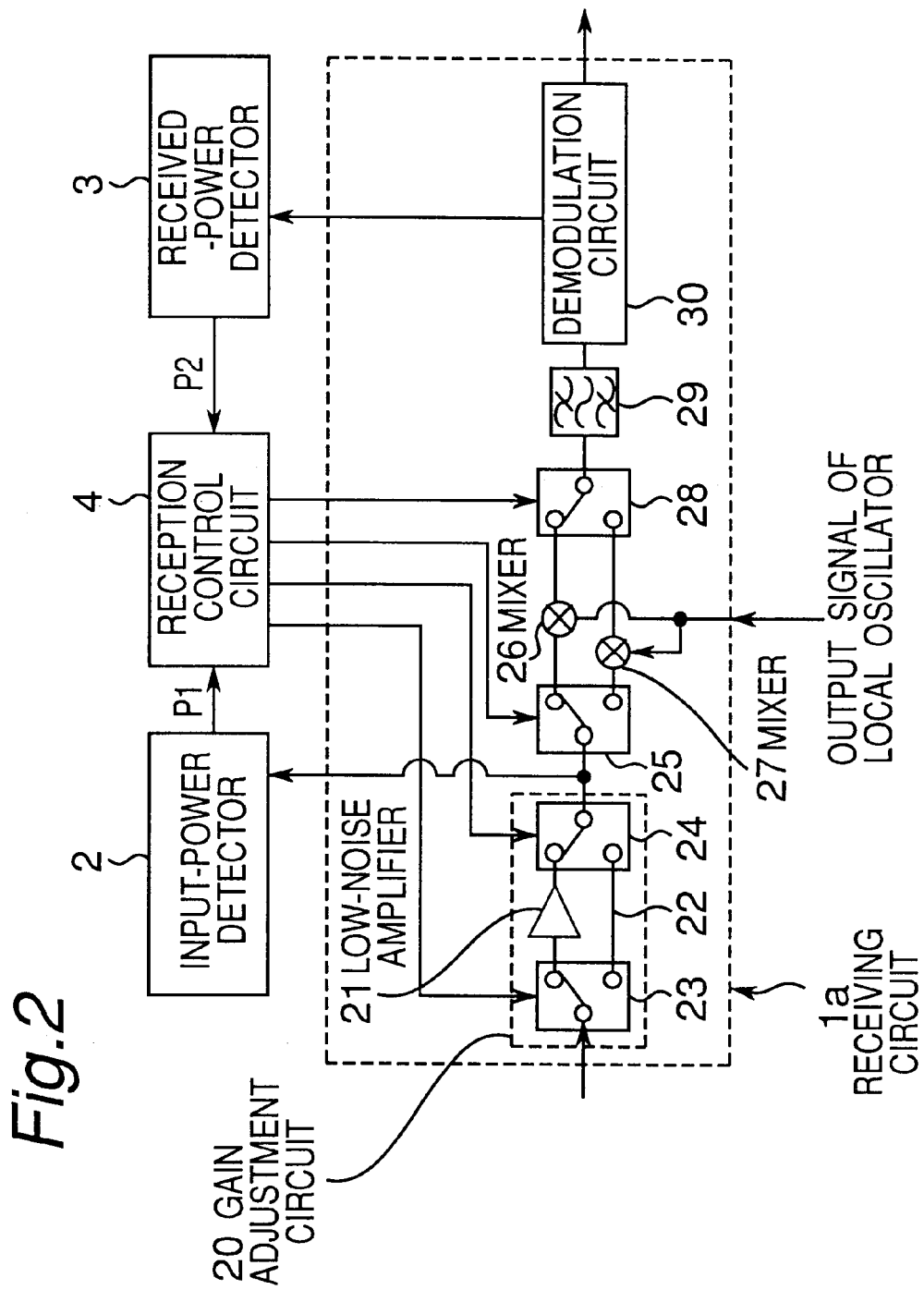
FIG. 2 is a block diagram of a receiving circuit of a radio circuit of embodiment 1.

FIG. 2 is an illustration showing a configuration of the receiving circuit 1a of the radio circuit shown in FIG. 1 constituted in accordance with the heterodyne system. The receiving circuit 1a comprises a gain adjustment circuit 20, switches 25 and 28, mixers 26 and 27, a band-pass filter 29, and a demodulation circuit 30.

The receiving circuit 1a, that is, the gain adjustment circuit 20, switches 25 and 28, mixers 26 and 27, and demodulation circuit 30 is/are controlled in accordance with control signals supplied from the reception control circuit 4. The gain adjustment circuit 20 is a circuit for adjusting a signal gain, and has a path including a low-noise amplifier 21 and a path including a bypass line 22. Either of these paths is selected by switches 23 and 24. When the path including the bypass line 22 is selected, the low-noise amplifier 21 is turned off to terminate its operation.

An output of the gain adjustment circuit 20 is selectively coupled to either of the mixers 26 and 27 by the switch 25. The mixer which is not selected is turned off. In this case, the mixer 26 serves as a frequency converter having a characteristic that the power consumption is small and an linearly-operating input range is small (for example, as shown by curve B in FIG. 8), and the mixer 27 serves as a frequency converter having a characteristic that the power consumption is large and a linearly-operating input range is large (for example, as shown by curve A in FIG. 8). The switch 28 is switched so that an output supplied from the mixer selected by the switch 25 is selected. An output of the switch 28 passes through the band-pass filter 29 serving as a filter for selecting a desired frequency, and thus a desired signal is demodulated by the demodulation circuit 30.

The input-power detector 2 receives an output of the gain adjustment circuit 20 and detects the input power P1. In this case, in the gain adjustment circuit 20, the switches 23 and 24 are controlled so that a received signal passes through the low-noise amplifier 21. That is, the input-power detector 2 detects the input power P1 in accordance with a signal amplified by the low-noise amplifier 21.

Figure 3:
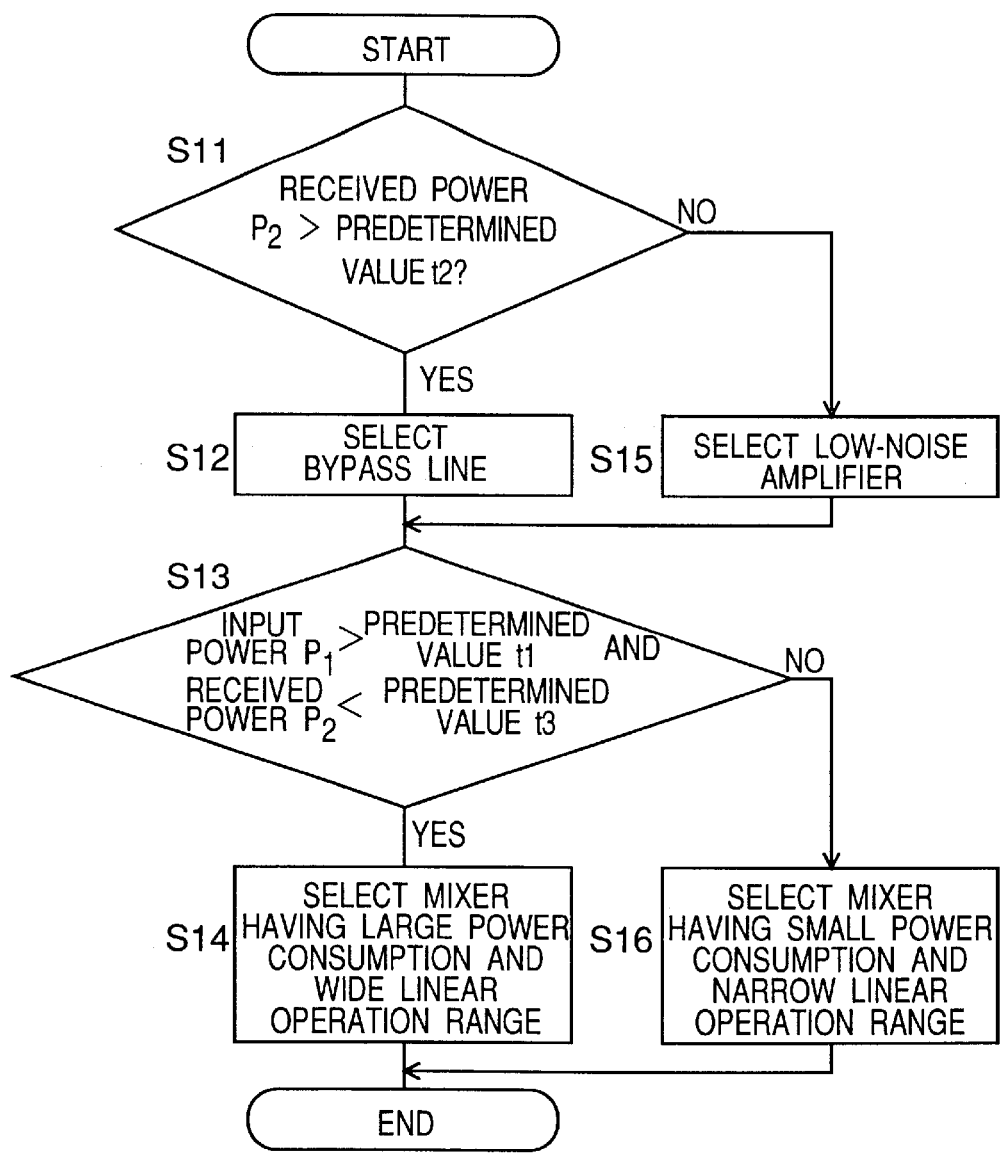
FIG. 3 is a flowchart showing an example of the power-consumption control of the receiving circuit of the radio circuit of the embodiment 1.

FIG. 3 shows a flowchart for the control of the power consumption of the receiving circuit 1a, that is, the control of a linear operation range. The control is performed by the reception control circuit 4, particularly, operations of the gain adjustment circuit 20 and switches 27 and 28 are controlled.

Referring to FIG. 3, the received power P2 detected by the received-power detector 3 is compared with the predetermined value t2 (S11). When the received power P2 is larger than the predetermined value t2, the bypass line 22 is selected (S12). When the received power P2 is equal to or smaller than the predetermined value t2, the low-noise amplifier 21 is selected (S15). Thus, when the level of a desired wave is high, the bypass line 22 is selected. In this case, since the low-noise amplifier 21 is turned off, the power consumption can be reduced. Then, the input power P1 and received power P2 detected by the input-power detector 2 and received-power detector 3 are compared with the predetermined values t1 and t3, respectively (S13). When the input power P1 is larger than the predetermined value t1 and the received power P2 is smaller than the predetermined value t3, that is, when the level of a desired wave is high, selected is the mixer 27 whose power consumption is large but whose linear operation range is wide (S14). Otherwise, selected is the mixer 26 whose power consumption is small and whose linear operation range is narrow (S16).

Figure 4:
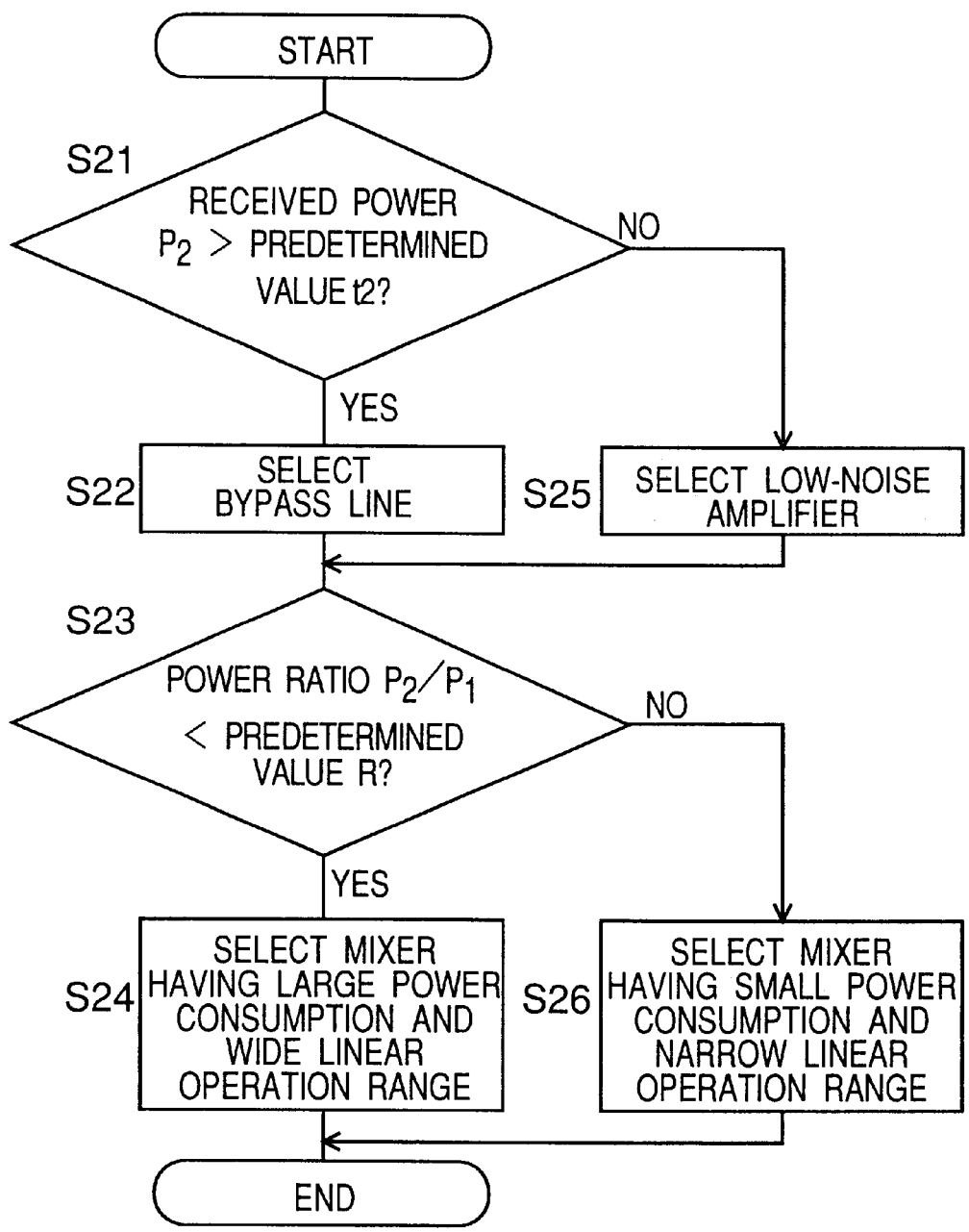
FIG. 4 is a flowchart showing another example of the power-consumption control of the receiving circuit system of the embodiment 1.

FIG. 4 shows another example of the power-consumption control of the receiving circuit 1a. In this example, the height of a received-signal level is determined in accordance with the ratio P2/P1 between the received power P2 and input power P1. That is, because a large power ratio P2/P1 represents a high received-wave level, the receiving circuit 1a is controlled so that its linear operation range is expanded.

In the control shown in FIG. 4, the received power P2 is compared with the predetermined value t2 (S21). The bypass line 22 is selected when the received power P2 is larger than the predetermined value t2 (S22), but the low-noise amplifier 21 is selected when the received power P2 is equal to or less than the predetermined value t2 (S25). When the bypass line 22 is selected, the low-noise amplifier 21 is turned off. Then, the ratio P2/P1 between the received power P2 and input power P1 is compared with the predetermined value R (S23). When the value of the power ratio P2/P1 is smaller than the predetermined value R, the mixer 27 having large power consumption and wide linear operation range is selected (S24). When the value of the power ratio P2/P1 is equal to or larger than the predetermined value R, the mixer 26 having small power consumption is selected (S26).

In the configuration shown in FIG. 2, two mixers 26 and 27 are provided and used to switch the linear operation range. However, only one mixer may be used, where the power consumption of the one mixer may be changed to change the linear operation range.

Embodiment 2

Figure 5:
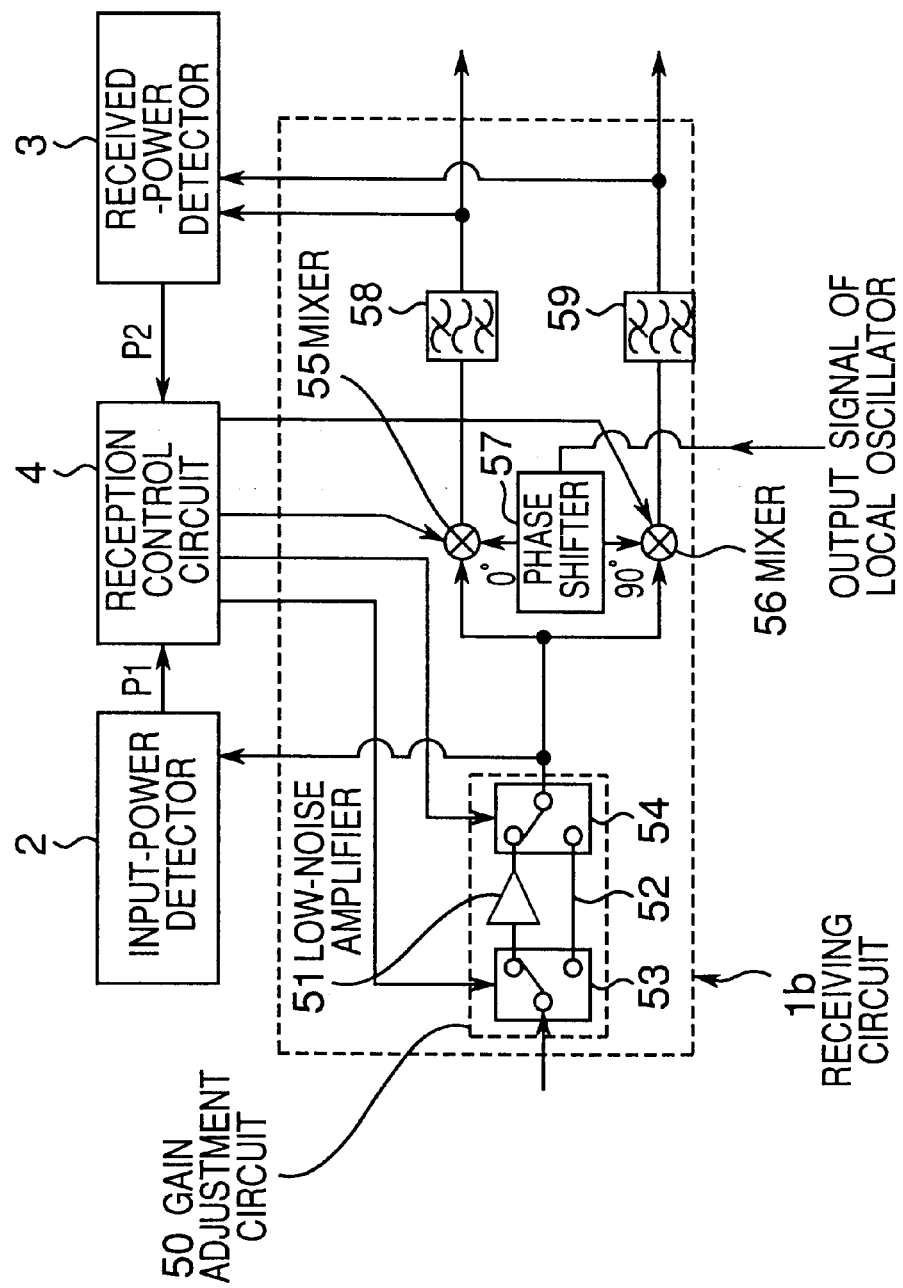
FIG. 5 is a block diagram of a receiving circuit of a radio circuit of embodiment 2.

In this embodiment, a direct conversion system is used for the above radio circuit as a receiving-circuit system. The radio circuit of this embodiment includes the same components as those of the radio circuit of the embodiment 1 except the receiving circuit. FIG. 5 shows the configuration of a receiving circuit 1b using the direct conversion system as a receiving circuit system.

The receiving circuit 1b includes a gain adjustment circuit 50, mixers 55 and 56, a phase shifter 57, and low-pass filters 58 and 59.

The gain adjustment circuit 50 comprises a low-noise amplifier 51, a bypass line 52, and switches 53 and 54. The switches 53 and 54 selects either of a path including the low-noise amplifier 51 and a path including the bypass line 52. The switches 53 and 54 are changed by the reception control circuit 4. When the bypass line 52 is selected, the low-noise amplifier 51 is turned off. An output of the gain adjustment circuit 50 is supplied to the mixers 55 and 56.

The mixers 55 and 56 expand their linear operation ranges by increasing their power consumption. The phase shifter 57 shifts the phase of an output signal of the local oscillator 7 by 90 degrees to output the phase-shifted output signal to the mixers 55 and 56. Thereby, the mixers 55 and 56 constitute an orthogonal demodulator for applying orthogonal demodulation to a signal having a desired frequency. Outputs of the mixers 55 and 56 are input to the low-pass filters 58 and 59 in which signals having unnecessary frequencies are attenuated to generate desired base-band reception signals.

Figure 6:
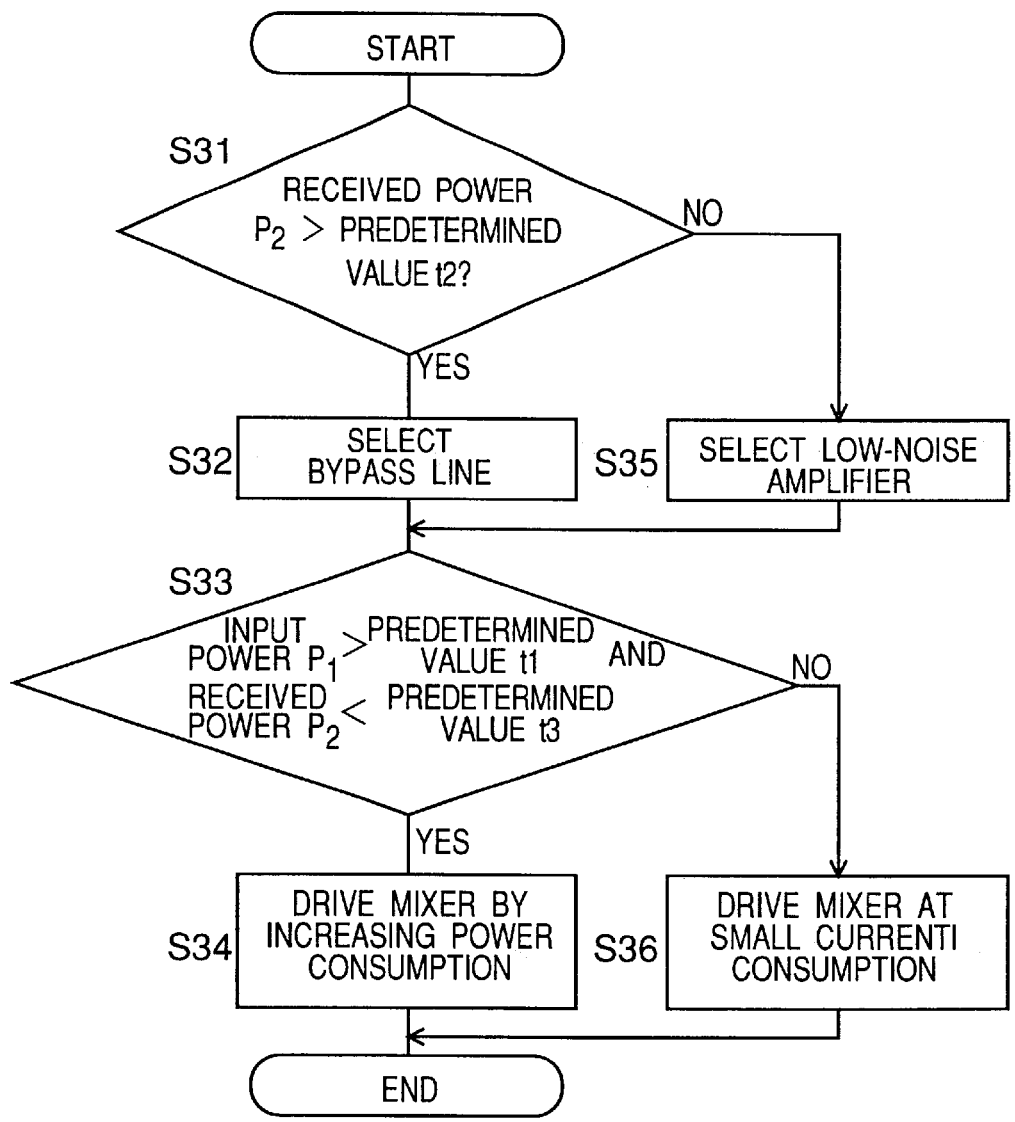
FIG. 6 is a flowchart showing an example of the power-consumption control of the receiving circuit of the radio circuit of the embodiment 2.

FIG. 6 shows an example of the power-consumption control of the receiving circuit 1b. The control shown by the flowchart in FIG. 6 basically corresponds to the control shown by the flowchart in FIG. 3 in the embodiment 1. In the control shown in FIG. 3, the detected input power P1 and received power P2 are compared respectively with the predetermined values t1 and t2 to select either of the mixers 26 and 27 different from each other in power consumption in accordance with the comparison result. In this embodiment, however, power consumption of the mixers 55 and 56 are controlled in accordance with a result of comparing detected powers (S34 and S36). That is, when the detected input power P1 is larger than the predetermined value t1 and the detected received power P2 is smaller than the predetermined value t3, the mixers 55 and 56 are controlled so as to increase power consumption thereof (S34). Thereby, linear operation ranges of the mixers 55 and 56 are expanded (for example, as shown by curve A in FIG. 8). Otherwise, the mixers 55 and 56 are controlled so as to operate at a small current consumption and with narrow linear operation range (for example, as shown by curve B in FIG. 8) (S36).

Figure 7:
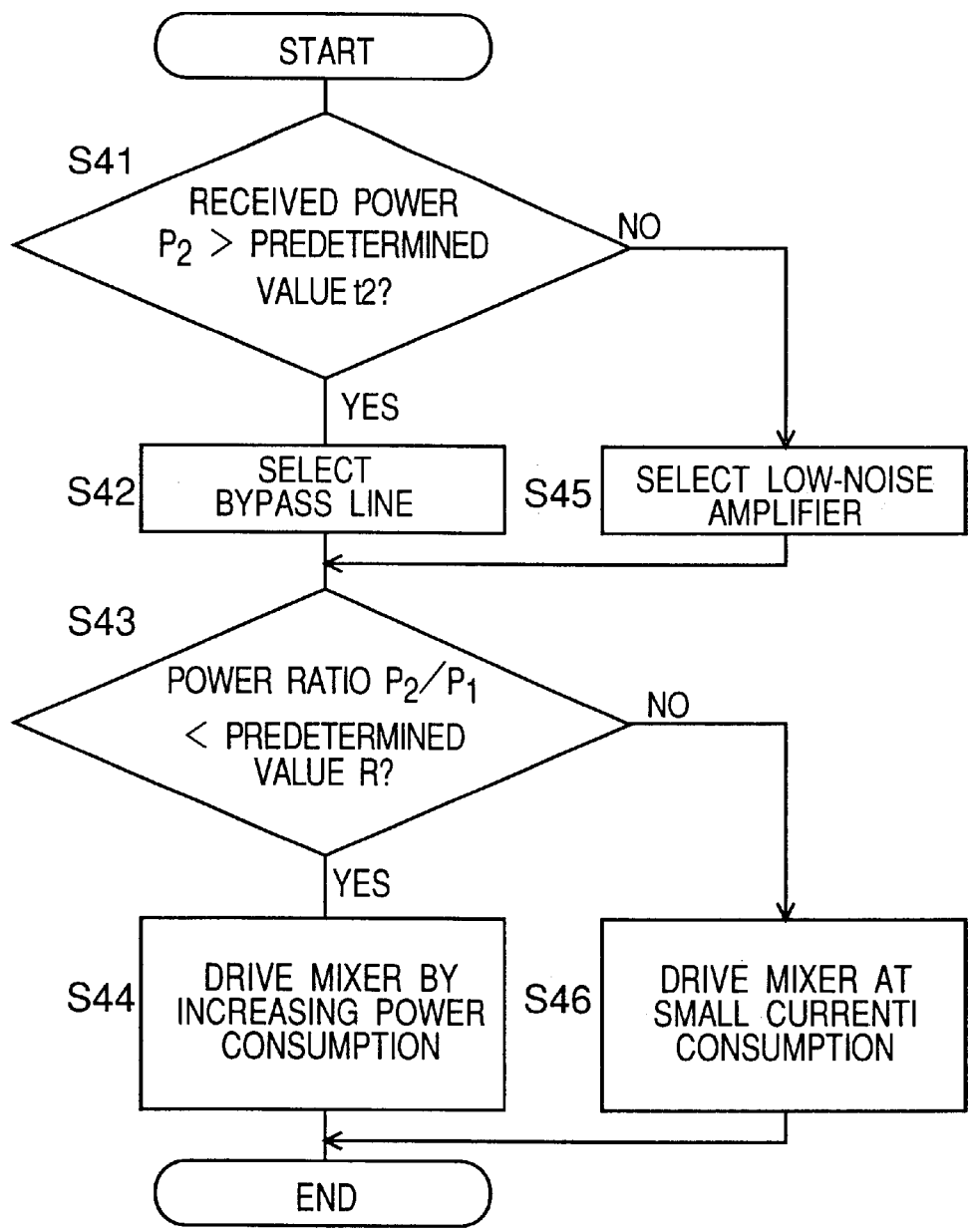
FIG. 7 is a flowchart showing another example of the power-consumption control of the receiving circuit of the radio circuit of the embodiment 2.

FIG. 7 shows another example of the power-consumption control of the receiving circuit 1b. The control shown by the flowchart in FIG. 7 basically corresponds to the control shown by the flowchart in FIG. 4 in the embodiment 1. In the control shown by the flowchart in FIG. 7, when the ratio P2/P1 between the detected received power P2 and input power P1 is smaller than the predetermined value R (S43), power consumption of the mixers 55 and 56 are increased in order to expand their linear operation ranges (S44). When the power ratio P2/P1 is equal to or more than the predetermined value R, the mixers 55 and 56 are controlled so as to operate at a small current consumption though their linear operation ranges are narrowed (S46).

Thus, application of the control shown in FIG. 6 or 7 to the circuit configuration shown in FIG. 5 can provide a circuit of which characteristics are not greatly deteriorated due to an interfering wave using the direct conversion system which is generally weak in the interfering wave, and which operates substantially at a small current consumption.

In the above embodiment, the mixer in the receiving circuit is changed in power consumption. However, instead of the mixer, another circuit as long as its linear operation range changes in accordance with power consumption may be changed in its power consumption. In this case, the another circuit may preferably be disposed immediately before a filter for selecting a desired frequency in the receiving circuit.

According to the present invention, a radio circuit comprises an input-power detector for detecting the input power of the receiving circuit and a received-power detector for detecting the level of a signal selected by the receiving circuit, and increases the power consumption of the receiving circuit in accordance with the detected values from the detectors to expand the linear operation range and thereby to make the receiving circuit operate with a low-distortion. Thus, a radio circuit can be provided which operates with a small power consumption and of which receiving characteristics are not greatly deteriorated due to an interfering wave.

The present disclosure relates to subject matter contained in priority Japanese Patent Application No. 2000-310457, filed on Oct. 11, 2000, the contents of which is herein expressly incorporated by reference in its entirety.

What is claimed is:

1. A radio circuit comprising:
   a receiving circuit including at least one circuit of which linear-operating range changes in accordance with power consumption, the receiving circuit receiving radio signals and selecting a signal having a desired frequency from the received signals to demodulate the selected signal;
   an input-power detector for detecting power input to the receiving circuit;
   a received-power detector for detecting power of the signal selected by the receiving circuit; and
   a control circuit for controlling the receiving circuit;
   wherein when the power detected by the input-power detector is larger than a first predetermined value and the power detected by the received-power detector is smaller than a second predetermined value, the control circuit increases power consumption of the circuit which is included in the receiving circuit and of which linear-operating range changes in accordance with power consumption to expand the linear operation range and thereby to make the receiving circuit operate at a low distortion.

2. The radio circuit according to claim 1, wherein the receiving circuit includes a filter for selecting a signal with a specific frequency to be received, and the circuit of which linear operation range changes in accordance with the power consumption is disposed immediately before the filter.

3. The radio circuit according to claim 1, wherein the receiving circuit includes a gain adjustment circuit for adjusting a signal gain, and decreases the gain of the gain adjustment circuit when the power detected by the received-power detector is larger than a predetermined value to suppress power consumption of at least one of the gain adjustment circuit and circuits disposed subsequently to the gain adjustment circuit.

4. The radio circuit according to claim 1, wherein the receiving circuit comprises a first path, a second path of which power consumption is larger than that of the first path and of which linear operation range is wider than that of the first path, and a switch for selecting either of the first and second paths in accordance with outputs of the input-power detector and the received-power detector, and wherein the path which is not selected is controlled to stop its operation.

5. The radio circuit according to claim 4, wherein the second path includes a low-noise amplifier, and the input-power detector detects the power at a point on the output side of the low-noise amplifier.

6. The radio circuit according to claim 1, wherein when the receiving circuit selects and receives a desired signal out of signals in a plurality of frequency bands, any signals in the plurality of frequency bands are received through the same circuit in the receiving circuit.

7. The radio circuit according to claim 1, wherein reception can be performed under transmission.

8. A radio circuit comprising:
a receiving circuit including at least one circuit of which linear-operating range changes in accordance with power consumption, the receiving circuit receiving radio signals and selecting a signal having a desired frequency from the received signals to demodulate the selected signal;
an input-power detector for detecting power P1 input to the receiving circuit;
a received-power detector for detecting power P2 of the signal selected by the receiving circuit; and
a control circuit for controlling the receiving circuit;
wherein when the value of the power ratio P2/P1 based on the power P1 detected by the input-power detector and the power P2 detected by the received-power detector is smaller than a predetermined value, the control circuit increases power consumption of the circuit which is included in the receiving circuit and of which linear-operating range changes in accordance with power consumption to expand the linear operation range and thereby to make the receiving circuit operate at a low distortion.

9. The radio circuit according to claim 8, wherein the receiving circuit includes a filter for selecting a signal with a specific frequency to be received, and the circuit of which linear operation range changes in accordance with the power consumption is disposed immediately before the filter.

10. The radio circuit according to claim 8, wherein the receiving circuit includes a gain adjustment circuit for adjusting a signal gain, and decreases the gain of the gain adjustment circuit when the power detected by the received-power detector is larger than a predetermined value to suppress power consumption of at least one of the gain adjustment circuit and circuits disposed subsequently to the gain adjustment circuit.

11. The radio circuit according to claim 8, wherein the receiving circuit comprises a first path, a second path of which power consumption is larger than that of the first path and of which linear operation range is wider than that of the first path, and a switch for selecting either of the first and second paths in accordance with outputs of the input-power detector and the received-power detector, and wherein the path which is not selected is controlled to stop its operation.

12. The radio circuit according to claim 11, wherein the second path includes a low-noise amplifier, and the input-power detector detects the power at a point on the output side of the low-noise amplifier.

13. The radio circuit according to claim 8, wherein when the receiving circuit selects and receives a desired signal out of signals in a plurality of frequency bands, any signals in the plurality of frequency bands are received through the same circuit in the receiving circuit.

14. The radio circuit according to claim 8, wherein reception can be performed under transmission.

15. A method of controlling a radio circuit comprising a receiving circuit including at least one circuit of which linear-operating range changes in accordance with power consumption, the receiving circuit receiving radio signals and selecting a signal having a desired frequency from the received signals to demodulate the selected signal, comprising:

detecting input power being input to the receiving circuit;

detecting receiving power of the signal selected by the receiving circuit; and increasing power consumption of the circuit which is included in the receiving circuit and of which linear-operating range changes in accordance with power consumption to expand the linear operation range and thereby to make the receiving circuit operate at a low distortion, when the detected input power is larger than a first predetermined value and the detected receiving power is smaller than a second predetermined value.

16. The method according to claim 15, wherein the receiving circuit includes a gain adjustment circuit for adjusting a signal gain, and decreases the gain of the gain adjustment circuit when the detected receiving power is larger than a predetermined value to suppress power consumption of at least one of the gain adjustment circuit and circuits disposed subsequently to the gain adjustment circuit.

17. A method of controlling a radio circuit comprising a receiving circuit including at least one circuit of which linear-operating range changes in accordance with power consumption, the receiving circuit receiving radio signals and selecting a signal having a desired frequency from the received signals to demodulate the selected signal, comprising:

detecting input power being input to the receiving circuit;

detecting receiving power of the signal selected by the receiving circuit; and increasing power consumption of the circuit which is included in the receiving circuit and of which linear-operating range changes in accordance with power consumption to expand the linear operation range and thereby to make the receiving circuit operate at a low distortion, when the value of the power ratio P2/P1 based on the detected input power P1 and the detected receiving power P2 is smaller than a predetermined value.

18. The method according to claim 17, wherein the receiving circuit includes a gain adjustment circuit for adjusting a signal gain, and decreases the gain of the gain adjustment circuit when the detected receiving power is larger than a predetermined value to suppress power consumption of at least one of the gain adjustment circuit and circuits disposed subsequently to the gain adjustment circuit.

* * * * *